United States Patent
Schultze et al.

(10) Patent No.: US 12,362,974 B2
(45) Date of Patent: Jul. 15, 2025

(54) SYSTEM AND METHOD FOR DATA COMMUNICATION USING AMPLITUDE-ENCODED SINUSOIDS

(71) Applicant: TeraWave, Inc., Naples, FL (US)

(72) Inventors: Torsten Schultze, Naples, FL (US); Alvie Smith, Naples, FL (US)

(73) Assignee: Terawave, Inc., Naples, FL (US)

( * ) Notice: Subject to any disclaimer, the term of this patent is extended or adjusted under 35 U.S.C. 154(b) by 112 days.

(21) Appl. No.: 18/177,647

(22) Filed: Mar. 2, 2023

(65) Prior Publication Data

US 2023/0318888 A1   Oct. 5, 2023

Related U.S. Application Data

(60) Provisional application No. 63/315,853, filed on Mar. 2, 2022.

(51) Int. Cl.
   *H04L 27/04* (2006.01)

(52) U.S. Cl.
   CPC .................... *H04L 27/04* (2013.01)

(58) Field of Classification Search
   CPC .... H04L 27/04; H04L 27/365; H04L 27/3881
   See application file for complete search history.

(56) References Cited

U.S. PATENT DOCUMENTS

| | | | |
|---|---|---|---|
| 2002/0140592 A1 | 10/2002 | Nguyen | |
| 2005/0195911 A1 | 9/2005 | Deng | |
| 2013/0070872 A1 | 3/2013 | Macrae | |
| 2019/0140873 A1 | 5/2019 | Schultze | |
| 2019/0173705 A1* | 6/2019 | Schultze | ................ H04L 27/36 |

OTHER PUBLICATIONS

International Search Report mailed on Jun. 2, 2023, for PCT Application No. PCT/US2023/063608, filed on Mar. 2, 2023, 4 pages.
Written Opinion of the International Searching Authority mailed on Jun. 2, 2023, for PCT Application No. PCT/US2023/063608, filed on Mar. 2, 2023, 8 pages.

* cited by examiner

*Primary Examiner* — Rahel Guarino
(74) *Attorney, Agent, or Firm* — Cooley LLP

(57) ABSTRACT

A system and method for data communication using amplitude-encoded sinusoids. The method includes encoding the input digital data using a plurality of symbol waveforms where each of the plurality of symbol waveforms occupies a period of a composite encoded waveform and represents at least one bit of the input digital data. A first symbol waveform of the plurality of symbol waveforms is defined by a sinusoid of a first amplitude and a second symbol waveform is defined by a sinusoid of a second amplitude different from the first amplitude. The method includes generating an encoded analog waveform from a representation of the composite encoded waveform.

12 Claims, 13 Drawing Sheets

SYSTEM AND METHOD FOR DATA COMMUNICATION USING AMPLITUDE-ENCODED SINUSOIDS

CROSS REFERENCE TO RELATED APPLICATIONS

This application claims priority to and the benefit of U.S. Provisional Patent Application No. 63/315,853, entitled SYSTEM AND METHOD FOR DATA COMMUNICATION USING AMPLITUDE-ENCODED SINUSOIDS, filed on Mar. 2, 2022, the disclosure of which is incorporated herein by reference in its entirety for all purposes.

FIELD

The present disclosure pertains generally to data communication systems and, in particular, to methods and systems for data communication using sine waves.

BACKGROUND

There are various transmission channels used for transmitting data or information. Telephone lines consisting of copper wires were used for well over a hundred years for transmitting both voice and data. Radio transmission of radio signals have been around for almost a hundred years. A radio station sends a radio signal out over the airwaves to be received by a radio set. As is known, a radio station has programming which may include music, news, or programs. Satellites are an example of another transmission channel in which a satellite dish positioned a first location is used to transmit a signal to a satellite to be beamed or sent from the satellite to a second satellite dish positioned at a location remote from the first location. More recently cellular communication systems have been used to communicate between cell phones. An enormous amount of data is being sent using cellular communication systems. At this point in time it is essential to be able to increase the data throughput over any transmission channel that is used. It is also important to address the problem of signal degradation during transmission of the signal. Some problems encountered when transmitting a signal over a transmission channel include transmission path delay, interference, and non-linearity.

Some transmission techniques or schemes that have been developed and used in an effort to increase data throughput over a transmission channel are Amplitude Modulation (AM), Frequency Modulation (FM), Phase Modulation, QAM (Quadrature Amplitude Modulation), QPSK (Quadrature Phase Shift Keying), PSK (Phase Shift Keying), and APSK (Amplitude and Phase Shift Keying).

Amplitude Modulation is a modulation technique used for transmitting information by use of a radio carrier wave. A sinusoidal carrier wave has its amplitude modulated by a message waveform before transmission. That is, the amplitude of the carrier wave is varied in proportion to that of the message waveform, such as an audio signal, which is typically of a substantially lower frequency than the frequency of the carrier wave. Some disadvantages associated with the use of an amplitude modulation signal are that an amplitude modulation signal is not efficient in terms of its power usage, it is not efficient in terms of its use of bandwidth, it requires a bandwidth equal to twice that of the highest audio frequency, and it is prone to high levels of noise.

Frequency Modulation is a modulation technique that encodes information in a carrier wave by varying the frequency of the wave. Although Frequency Modulation has some advantages over Amplitude Modulation some disadvantages include that it requires a more complicated demodulator and that is has a poorer spectral efficiency than some other modulation techniques.

QAM is a form of multilevel amplitude and phase modulation that modulates a source signal into an output waveform with varying amplitude and phase. A system that employs QAM modulates a source signal into an output waveform with varying amplitude and phase. A message to be transmitted is mapped to a two-dimensional four quadrant signal space or constellation having signal points or phasors each representing a possible transmission level. Each signal point in the constellation is referred to as a symbol. The QAM constellation has a coordinate system defined by an I or in-phase axis and a Q or quadrature axis or an IQ plane. A symbol may be represented by both I and Q components. One of the disadvantages of the use of QAM is that for the higher data rates the peak to average power ratio is high. For example, in a typical constellation diagram for 16QAM, it can be seen that there are four possible power levels. As the order of the modulation increases, so the number of power levels needed increases. All of this results in ever higher peak to average power ratios being experienced.

QPSK has a synchronous data stream modulated onto a carrier frequency before being over a channel. The carrier can have four states such as 45°, 135°, 225°, or 315°. QPSK also employs a quadrature modulation where the signal points can be described using two orthogonal coordinate axes, such as the IQ plane. With conventional QPSK, there is the problem that the transition between two diagonal transmission symbol points in the complex plane passes through the zero point. In the transition between these diagonal transmission symbols, a lowering of the amplitude may occur, the so-called envelope, to practically zero. On the receiver side, it complicates the necessary synchronization and favors nonlinearities in the transmission path, signal distortion, and unwanted intermodulation.

PSK is another digital modulation process which transmits a message by modulating the phase of a carrier wave. One disadvantage of using PSK is that when a high order PSK constellation is used the error-rate becomes too high.

As the name APSK indicates, this form of modulation uses amplitude and phase shift keying. In this modulation scheme a signal is conveyed by modulating both the amplitude and the phase of a carrier wave. Amplitude and frequency shift keying is able to reduce the number of power levels required to transmit information for any given modulation order.

SUMMARY

In one aspect the disclosure relates to a method for data communication using amplitude-encoded sinusoids. The method includes encoding input digital data using a plurality of symbol waveforms. Each of the plurality of symbol waveforms occupies a period of a composite encoded waveform and represents at least one bit of the input digital data. In addition, each symbol waveform has a first half sinusoid of a first polarity and a second half sinusoid of a second polarity opposite to the first polarity. A first symbol waveform of the plurality of symbol waveforms is defined so that the first half sinusoid is of a first amplitude and the second half sinusoid is of a second amplitude different from the first amplitude. A second symbol waveform of the plurality of symbol waveforms is defined so the first half sinusoid is of the second amplitude and the second half sinusoid is of the first amplitude. An encoded analog waveform is generated from a representation of the composite encoded waveform.

The disclosure also relates to a method of recovering input digital data encoded by symbol waveforms where each of the symbol waveforms occupies a period of an encoded composite waveform, represents at least one bit of the input digital data, and includes a first half sinusoid and a second half sinusoid. The method includes receiving an encoded analog waveform generated using a plurality of the symbol waveforms. Digital symbol samples representing replicas of the plurality of symbol waveforms are then generated from the received encoded analog waveform. The method includes identifying samples of the digital symbol samples corresponding to first and second maximum values of the first half sinusoid and the second half sinusoid, respectively, of each of the replicas of the plurality of symbol waveforms. The input digital data is estimated based upon the first and second maximum values of the first half sinusoid and the second half sinusoid of each of the replicas of the plurality of symbol waveforms.

In another aspect the disclosure is directed to a data communication system including an input buffer configured to store input digital data. A time domain modulator for encodes the input digital data using a plurality of symbol waveforms where each of the plurality of symbol waveforms occupies a period of a composite encoded waveform and represents at least one bit of the input digital data. Each symbol waveform has a first half sinusoid of a first polarity and a second half sinusoid of a second polarity opposite to the first polarity. The time domain modulator defines a first symbol waveform of the plurality of symbol waveforms so that the first half sinusoid of the first symbol waveform is of a first amplitude and the second half sinusoid of the first symbol waveform is of a second amplitude different from the first amplitude. The time domain modulator also defines a second symbol waveform of the plurality of symbol waveforms so that the first half sinusoid of the second symbol waveform is of the second amplitude and the second half sinusoid of the second symbol waveform is of the first amplitude. One or more digital-to-analog converters generate an encoded analog waveform from a representation of the composite encoded waveform.

The disclosure is also directed to an alternate method for data communication using amplitude-encoded sinusoids. The method includes encoding the input digital data using a plurality of symbol waveforms where each of the plurality of symbol waveforms occupies a period of a composite encoded waveform and represents at least one bit of the input digital data. A first symbol waveform of the plurality of symbol waveforms is defined by a sinusoid of a first amplitude and a second symbol waveform is defined by a sinusoid of a second amplitude different from the first amplitude. The method includes generating an encoded analog waveform from a representation of the composite encoded waveform.

In a further aspect the disclosure concerns a method of recovering input digital data encoded by symbol waveforms where each of the symbol waveforms represents at least one bit of the input digital data and includes a one-period sinusoid occupying a period of an encoded composite waveform. Each one period sinusoid is of a first amplitude corresponding to a first bit value or of a second amplitude corresponding to a second bit value. The method includes receiving an encoded analog waveform generated using a plurality of the symbol waveforms and generating, using the encoded analog waveform, digital symbol samples representing the plurality of symbol waveforms. The method further includes identifying, based upon the digital symbol samples, recovered sinusoidal amplitudes corresponding to replicas of the plurality of symbol waveforms. The input digital data is then estimated based upon the recovered sinusoidal amplitudes.

The disclosure also pertains to a data communication system including an input buffer configured to store input digital data. A time domain modulator encodes the input digital data using a plurality of symbol waveforms where each of the plurality of symbol waveforms occupies a period of a composite encoded waveform and represents at least one bit of the input digital data. The time domain modulator defines a first symbol waveform of the plurality of symbol waveforms using a sinusoid of a first amplitude and defines a second symbol waveform using a sinusoid of a second amplitude different from the first amplitude. One or more digital-to-analog converters generate an encoded analog waveform from a representation of the composite encoded waveform.

These and other advantages of the present disclosure will become apparent after considering the following detailed specification in conjunction with the accompanying drawings, wherein:

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. Also, common but well-understood elements that are useful or necessary in a commercially feasible embodiment are often not depicted in order to facilitate a less obstructed view of these various embodiments of the present invention. In the drawings, like reference characters generally refer to like features (e.g., functionally similar and/or structurally similar elements).

DETAILED DESCRIPTION

Figure 1:
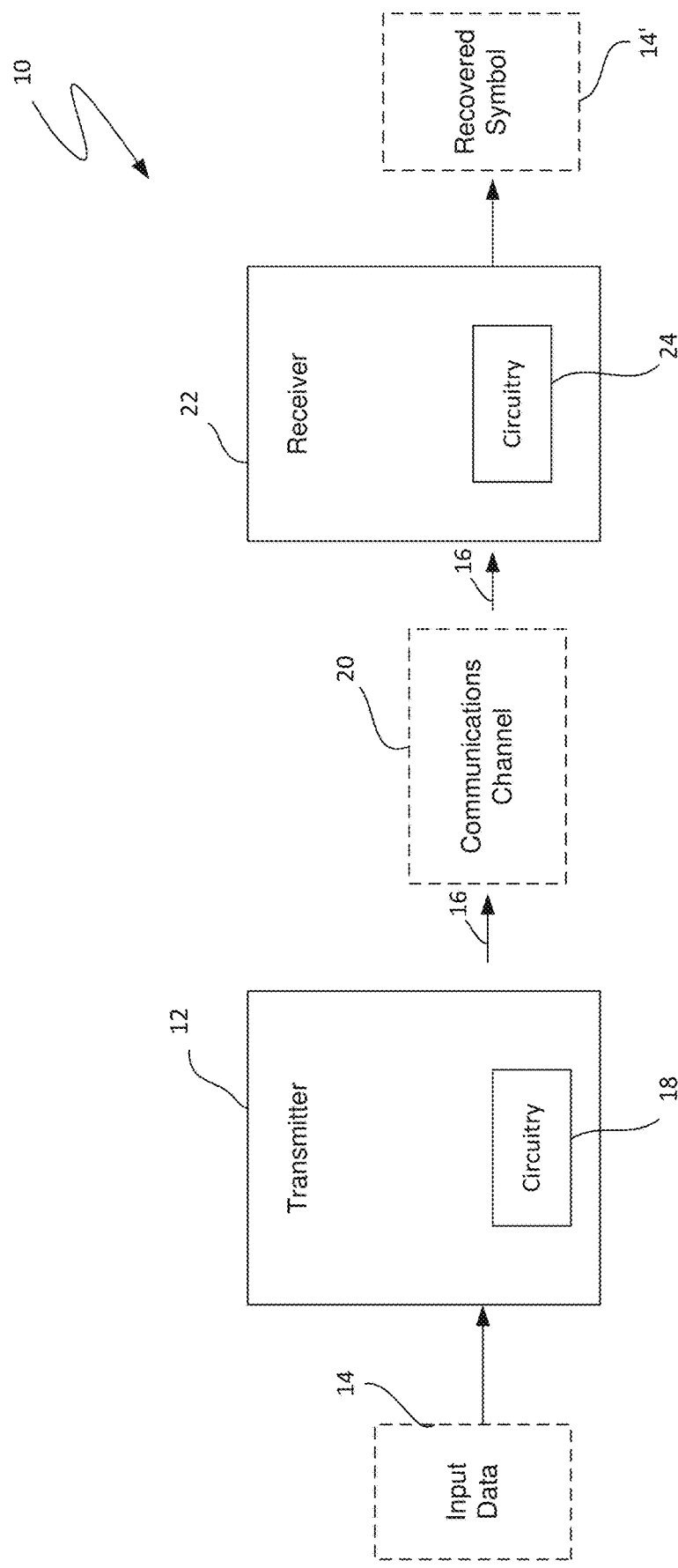
FIG. 1 is a block diagram of a communications system having a transmitter and a receiver constructed in accordance with the present disclosure.

Referring now to the drawings, wherein like numbers refer to like items, number 10 identifies a communications system constructed according to the present disclosure. With reference now to FIG. 1, the data transmission or communications system 10 is shown to comprise a transmitter 12 for receiving input data 14 and for generating an encoded waveform 16 comprised of amplitude-encoded sinusoids representative of the input data 14. In the embodiment of FIG. 1, each period of the encoded waveform 16 includes one cycle of an amplitude-encoded sinusoid representative of one bit of the input data 14. Circuitry 18 transmits the encoded waveform 16 over a communications channel 20. The system 10 also comprises a receiver 22 for receiving the encoded waveform 16, and circuitry 24 for recovering a replica of the input data 14 from the encoded waveform. The receiver 22 may output the recovered input data 14 to some other device, such as, by way of example only, a monitor, a computer, an audio component, or a speaker. The communications channel 20 may be provided by media such as coaxial cable, fiber optic cable, telephone or telephone company (telco) lines such as copper wires, open air as by radio frequency or space or satellite. The channel 20 may carry one or many messages.

Figure 2:
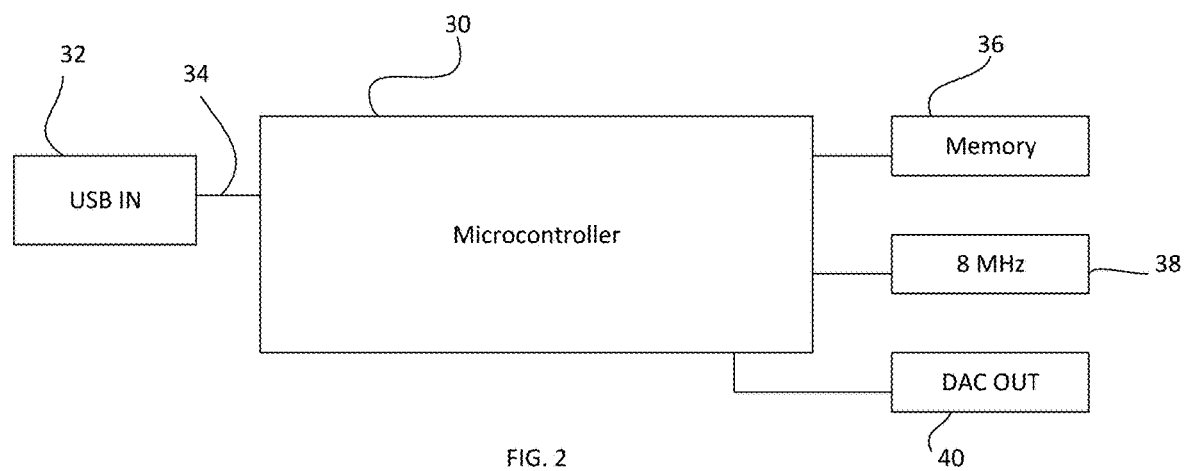
FIG. 2 is a block diagram of an embodiment of the transmitter shown in FIG. 1.

With reference now to FIG. 2, a block diagram of the transmitter 12 is depicted. The transmitter 12 has a microcontroller 30 that has an USB input 32 for receiving the input data 14, which may represent, for example, music, video, text, or a combination thereof. The input data 14 is provided from the USB input 32 to the microcontroller 30 over a connection 34. The microcontroller 30 may also include memory 36, such as a 16 MB memory, an 8 MHz input 38, and a digital-to-analog converter (DAC) output 40. The microcontroller 30 can produce a sine wave or other waveform and a sine table, read in the input data 14, disassemble the input data 14, and modulate the amplitude of individual sine wave cycles, or half-cycles thereof, to generate the encoded waveform 16 representative of the input data 14.

As is discussed below, each period of the encoded waveform 16 includes an amplitude-encoded sinusoid having a half sinusoid of positive polarity and a half sinusoid of negative polarity. The amplitudes of the positive half sinusoid and the negative half sinusoid may be set so as to define two or more different amplitude-encoded sinusoids, or symbols, each of which may represent a bit of information. In a "full wave" implementation the amplitude of both half-sinusoids within a given period of the encoded waveform 16 is set to the same level. In a "half wave" implementation the amplitude of the positive and negative half-sinusoids within a given period of the encoded waveform 16 are set to different levels. The microcontroller 30 provides the signal 16 to the DAC output 40. The DAC output 40 may be connected to other circuitry (not shown) that can transmit the encode waveform 16. An example of the microcontroller 30 is a device manufactured by STMicroelectronics known as STM32F756 family of microcontrollers or other similar microcontroller may be used.

Figure 3:
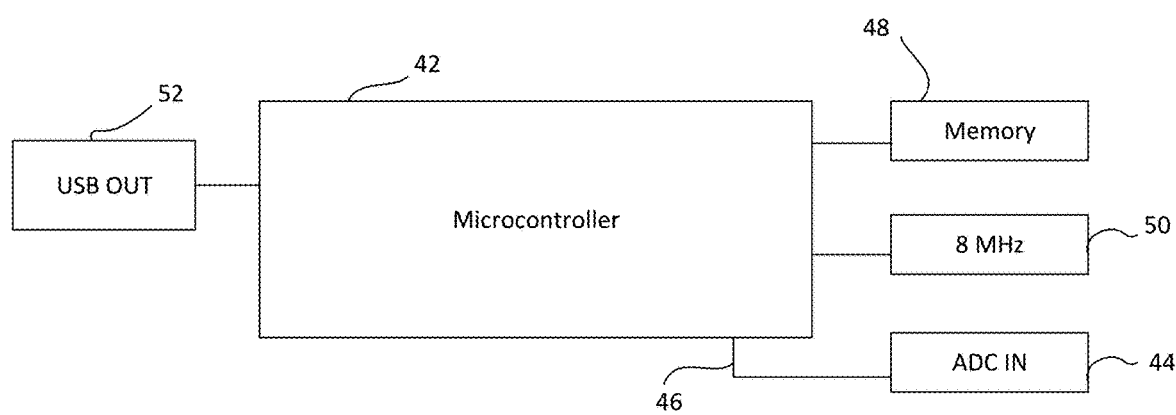
FIG. 3 is a block diagram of an embodiment of the receiver shown in FIG. 1.

FIG. 3 shows a block diagram of the receiver 22 constructed according to the present disclosure. The receiver 22 comprises a microcontroller 42 that has an analog to digital converter (ADC) input 44 for receiving the full-wave encoded or half-wave encoded signal 16 transmitted by the transmitter 12. The signal 16 from the input 44 is provided to the microcontroller 30 over a connection 46. The microcontroller 42 may also include memory 48, such as a 16 MB memory, an 8 MHz input 50, and an RS232 or USB output 52. The output 52 is provided to another device (not shown), such as a speaker. The microcontroller 42 is capable of generating amplitude-encoded sinusoids of the type described herein. The microcontroller 42 also reads in the signal 16 from the ADC input 44, reassembles the input data 14, and sends the symbol to the output 52 for use by the other device (not shown). Again, an example of the microcontroller 30 is a device manufactured by STMicroelectronics known as STM32F756 family of microcontrollers or other similar microcontroller may be used.

As is discussed below, each period of the encoded waveform 16 includes an amplitude-encoded sinusoid having a half sinusoid of positive polarity and a half sinusoid of negative polarity. In the full wave implementation of the present encoding scheme, both the amplitude of the positive half cycle and the negative half cycle of the amplitude-encoded sinusoid within each period of the encoded waveform 16 are dependent upon the value of the bit of the input data 14 represented by such period of the encoded waveform. In the half wave implementation of the present encoding scheme, the amplitudes of the positive half cycle and the negative half cycle of the amplitude-encoded sinusoid within each period of the encoded waveform 16 are different and dependent upon the value of the bit of the input data 14 represented by such period of the encoded waveform. Thus, one or more aspects of the amplitude of the sinusoid within a given period of the encoded waveform 16 are encoded in order to reflect the bit value of the input data associated with such period, and each such amplitude-encoded sinusoid is of identical duration. As a consequence, the frequency of the encoded waveform 16 is constant and each amplitude-encoded sinusoid crosses zero at the beginning and end of a period of the encoded waveform 16 and completely defines a bit value of input digital data. It is believed that these characteristics of the disclosed encoding scheme, which fundamentally differ from those of conventional signal modulation techniques, contribute to the observed concentration of nearly all of the signal energy of encoded waveforms 16 generated in accordance with the disclosure within very narrow bandwidths.

Figure 4:
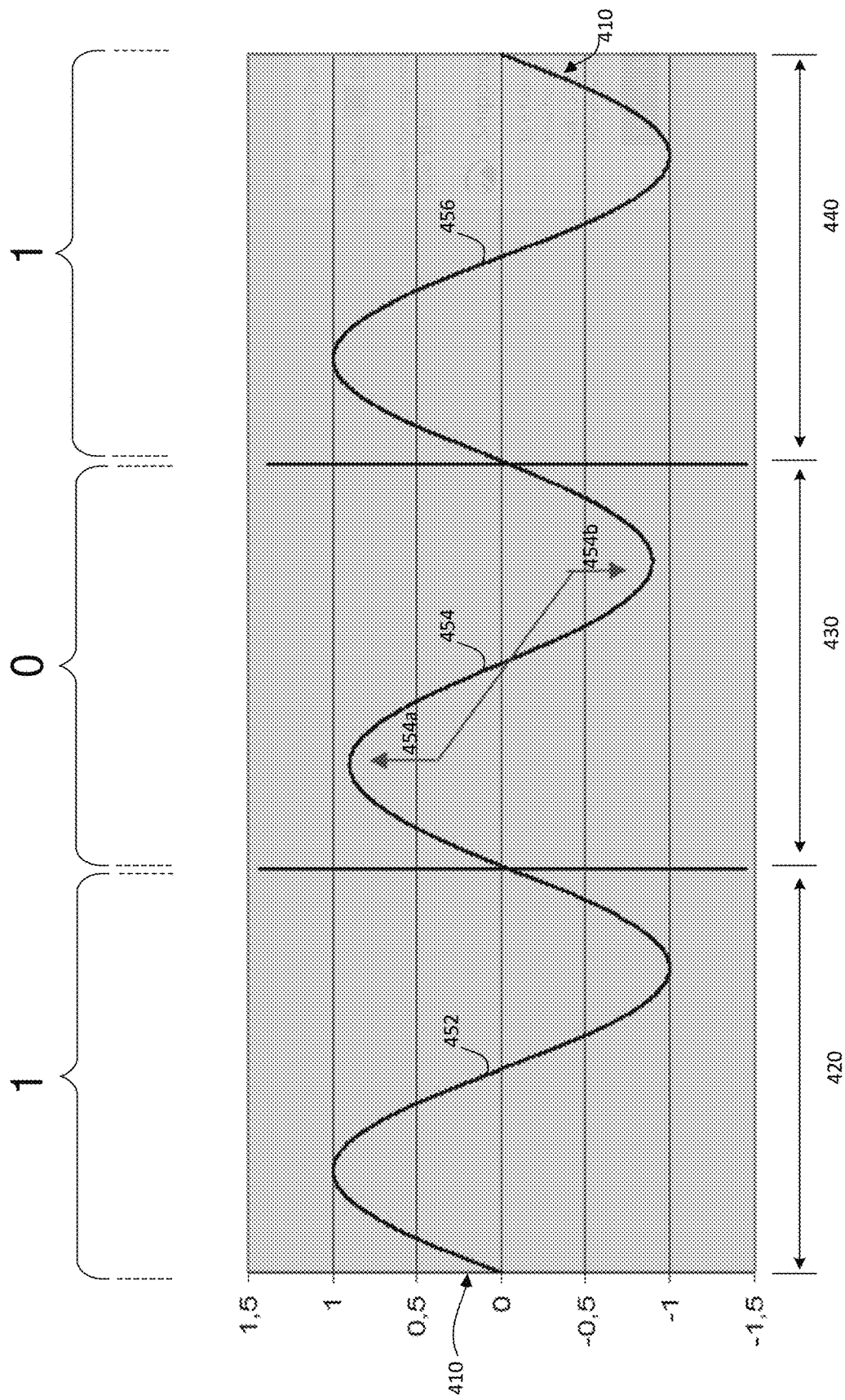
FIG. 4 illustrates three periods of an encoded waveform generated using full-wave sinusoid encoding in accordance with the disclosure.

Attention is now directed to FIG. 4, which represents three periods of an encoded waveform 410 generated using full-wave amplitude encoding in accordance with the disclosure. Again, in the full-wave implementation of the present encoding scheme, both the amplitude of the positive half cycle and the negative half cycle of the amplitude-encoded sinusoid within each period of the encoded waveform 410 are dependent upon the input bit value. For example, if the bit value of the input data is "1", then both the positive half cycle and the negative half cycle of the amplitude-encoded sinusoid within the applicable period of the encoded waveform 410 representing this "1" are set to a first value. On the other hand, if the bit value of the input data is "0", then both the positive half cycle and the negative half cycle of the amplitude-encoded sinusoid within the period of the encoded waveform 410 representing this "0" may be set to a different, second value. In the specific example of FIG. 4, the amplitudes of sinusoids 452 and 456 respectively defined during a first period 420 and a third period 440 of the waveform 410 are both set to the level 1.0. The amplitude of a sinusoid 454 defined during a second period 430 of the waveform 410 is set to a level of approximately 0.9, as indicated by the amplitudes of the peaks 454*a* and 454*b* of positive and negative half cycles of the sinusoid 454. In the embodiment of FIG. 4 the symbol defined by the sinusoid 452 in the first waveform period 420 represents a logical "1", the symbol defined by the sinusoid 454 in the second waveform period 430 represents a logical "0", and the symbol defined by the sinusoid 456 in the third waveform period 440 represents a logical "1".

Figure 5:
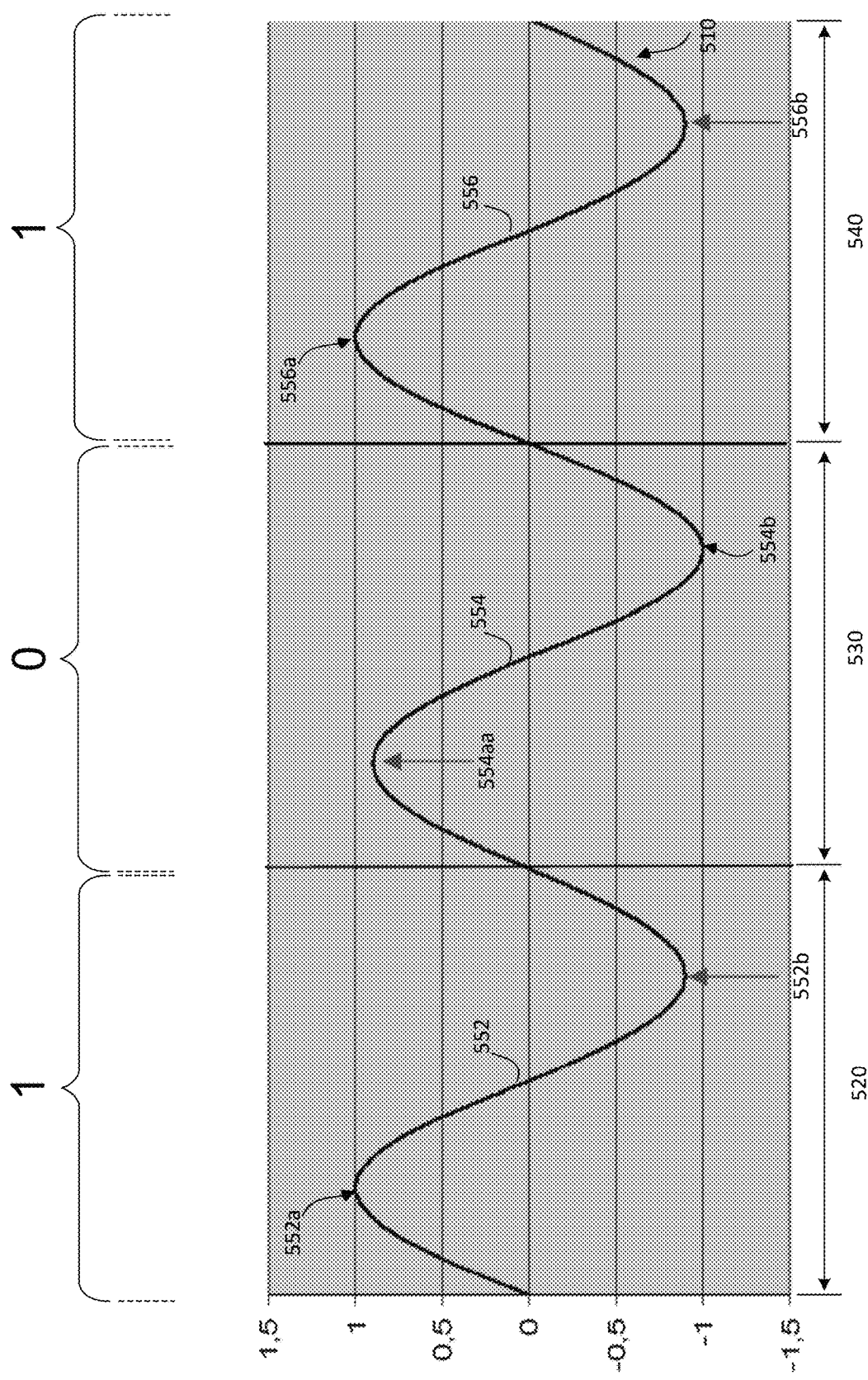
FIG. 5 illustrates three periods of an encoded waveform generated using half-wave sinusoid encoding in accordance with the disclosure.

Turning now to FIG. 5, an illustration is provided of three periods of an encoded waveform 510 generated using half-wave amplitude encoding in accordance with the disclosure. Again, in the half-wave implementation of the present encoding scheme, the amplitudes of the positive half cycle and the negative half cycle of the amplitude-encoded sinusoid within each period of the encoded waveform 510 are different and dependent upon the value of the bit of the input data represented by such period of the encoded waveform 510. In the specific example of FIG. 5, an amplitude-encoded sinusoid 552 defined within a first period 520 of the waveform 510 represents a bit value of the input data of "1". In this case a peak 552*a* of a positive half cycle of the sinusoid 552 is set to a first, nominal amplitude (e.g., 1.0) and a peak 552*b* of a negative half cycle is set to a different, second amplitude (e.g., 0.8). As shown, an amplitude-encoded sinusoid 554 defined within a second period 530 of the waveform 510 represents a bit value of the input data of "0". In this case a peak 554*a* of a positive half cycle of the amplitude-encoded sinusoid 554 is set to the second amplitude (e.g., 0.8) and a peak 554*b* of a negative half cycle is set to the nominal amplitude (e.g., 1.0). An amplitude-encoded sinusoid 556 defined within a third period 540 of the waveform 510 represents a bit value of the input data of "1". In this case a peak 556*a* of the positive half cycle of the waveform 556 is set to the first amplitude (e.g., 1.0) and a peak 556*b* of a negative half cycle is set to the second amplitude (e.g., 0.8).

This use of amplitude-encoded sinusoids, or symbols, such as those illustrated in FIGS. 4 and 5 to represent a data bit during each period of an encoded waveform differs from conventional amplitude modulation in a number of respects. First, in conventional amplitude modulation the frequency of the envelope formed by the message or information signal is typically much lower than the frequency of the carrier signal. In contrast, in the present system the input data rate may be equivalent to the inverse of the period of the encoded waveform. Second, and unexpectedly, nearly all of the signal energy of encoded waveforms comprised of the amplitude-encoded sinusoids of the type described herein has been found to be concentrated within extremely narrow bandwidths. In particular, the bandwidth occupied by encoded waveforms of the present disclosure can become vanishingly small and possibly dependent only upon the accuracy of the equipment used (e.g., on the phase noise and jitter of such equipment). As a consequence, extremely efficient use of spectrum may be achieved since adjacent encoded waveforms may be spaced extremely closely.

As may be appreciated with reference to FIGS. 4 and 5, the sine wave encoding described herein may be characterized as sub-periodic encoding in that it may be conceptualized as the encoding of the amplitude of a sine wave during and within individual periods of the sine wave rather than across multiple periods of a sinusoidal carrier. That is, the beginning and end of each period of the sine wave is not modified as a result of the relatively subtle amplitude adjustments imposed within such periods. This results in a series of amplitude-encoded sinusoids of identical periods where the amplitudes of the positive and negative half sinusoids of each amplitude-encoded sinusoid correspond to an associated bit value.

Figure 14B:
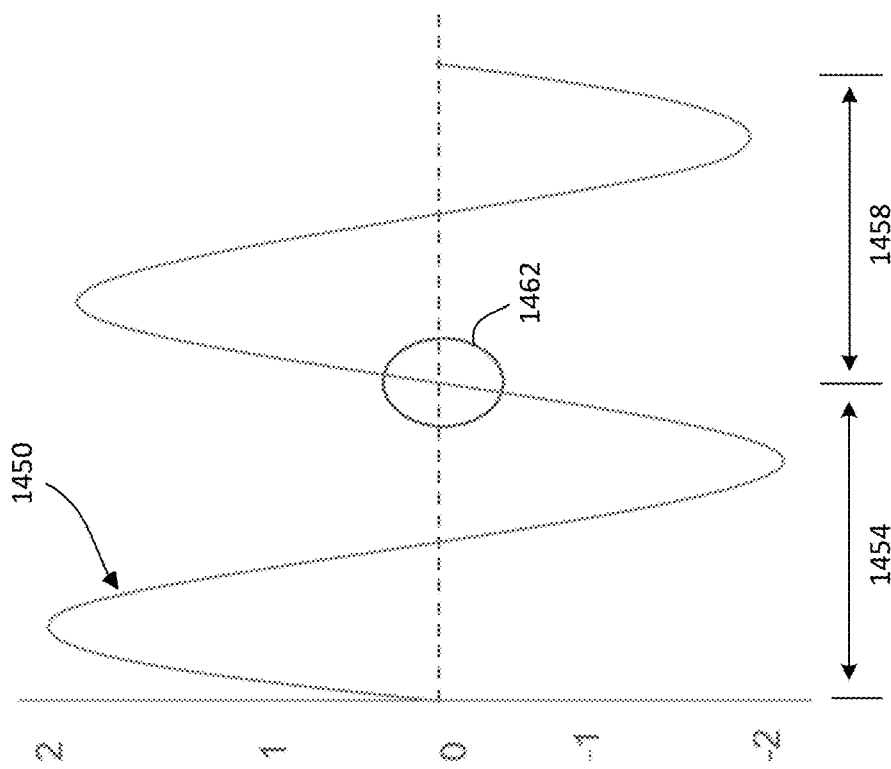
FIG. 14B illustrates an encoded sinusoidal waveform shaped in order to minimize any noise associated with a transition of the waveform from a first period to a second period within a transition region.
Figure 14A:
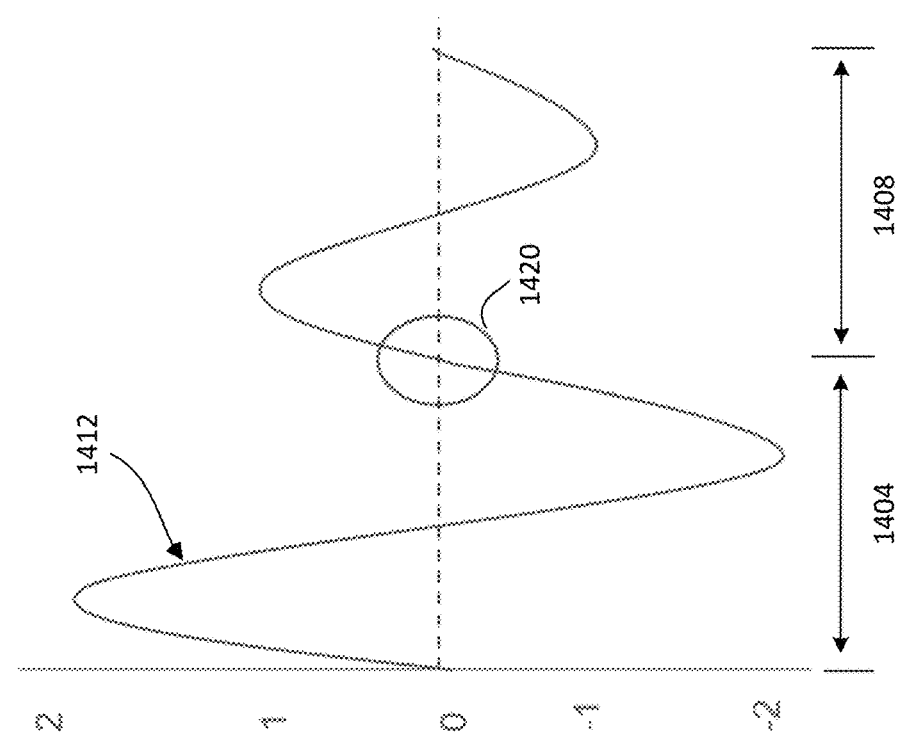
FIG. 14A illustrates first and second periods of an encoded sinusoidal waveform in accordance with the disclosure.

Turning now to FIG. 14A, first and second periods 1404, 1408 of an encoded sinusoidal waveform 1412 are illustrated. In the embodiment of FIG. 14A the first period 1404 of the waveform 1412 may encode a logical "1" and the second period 1408 may encode a logical "0". As shown, the amplitude of the encoded waveform 1412 is 2.0 within the first period 1404 and is 1.0 within the second period 1408. Although the waveform 1412 is continuous in a transition region 1420 between the first period 1404 and the second region 408, the waveform may not be differentiable at the zero crossing within the transition region 1420. Moreover, the substantial difference in amplitude of the encoded waveform 1412 between the first period 1408 and the second period 1408 may contribute to the generation of noise within the transition region 1420. However, the magnitude of such noise is not anticipated to be substantial given that the amplitude of the waveform 1412 is essentially zero at the time of the transition from the first period 1404 to the second period 1408.

FIG. 14B illustrates an encoded sinusoidal waveform 1450 shaped in order to minimize any noise associated with a transition of the waveform 1450 from a first period 1454 to a second period 1458 within a transition region 1462. As shown, the amplitude of the waveform 1450 is 2.0 during the first period 1454 and 1.9 within the second period 1458. This minimizes the change in slope of the waveform 1450 as it transitions between the first period 1454 and the second period 1458 within the transition region 1462 and thus also minimizes generation of noise energy associated with the transition. It has been found that noise associated with the transition region is minimized when the amplitude of the waveform 1450 within the second period 1458 is within 10% of the amplitude of the waveform 1450 within the first period 1458, and preferably when the amplitude of the waveform 1450 within the second period 1458 is within 5% of the amplitude of the waveform 1450 within the first period 1458. More generally, the smoothness of the transitions between periods of the waveform 1450 will be dependent upon both the amplitude variance between periods and the resolution of the DAC 40. For example, use of a 12-bit DAC provides 4,096 levels of granularity between +1 and −1, which should render any resulting transition noise substantially attenuated. Moreover, by pipelining DACs the resolution within the transition region 1462 may essentially be made as precise as desired.

In one embodiment the encoded waveform comprised of amplitude-encoded sinusoids is directly generated as a sequence of voltage points using a software-defined radio (SDR). This sequence of voltage points may then be provided to a digital to analog converter for generation of a corresponding analog version of the encoded waveform. As indicated above, when digitally generated to define amplitude-encoded sinusoidal symbols of the type described herein, such generation substantially avoids the creation of harmonics and sidebands. This is believed to be a significant departure from the prior art, in which conventional modulation of sinusoids induces the creation of harmonics and sidebands of material power. Such conventional techniques then typically require that either the sinusoidal carrier or the sidebands be suppressed or otherwise filtered.

Figure 6:
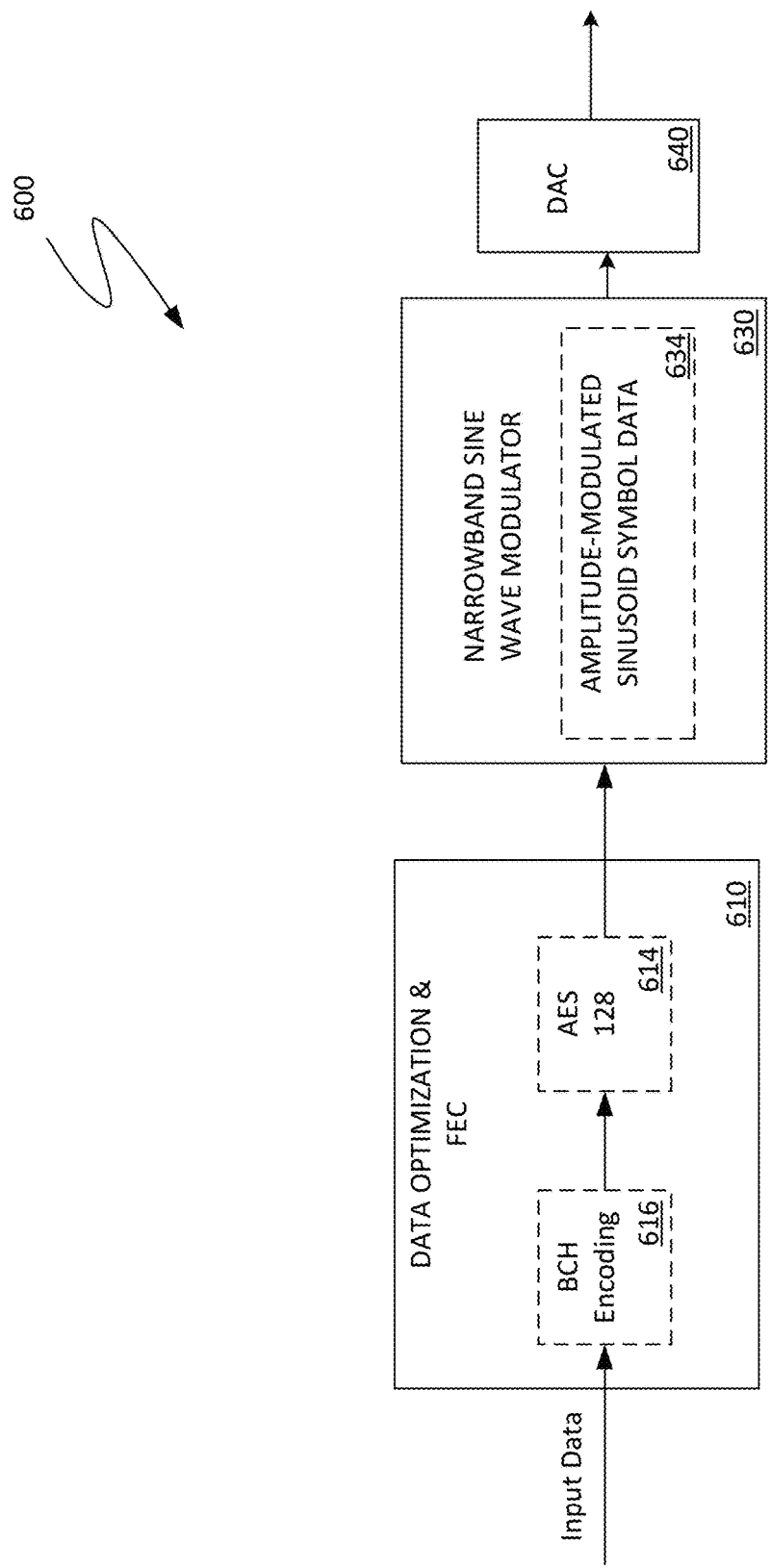
FIG. 6 is a block diagram of transmitter configured to implement sine wave amplitude encoding in accordance with the disclosure.

Attention is now directed to FIG. 6, which is a block diagram of transmitter 600 configured to implement sine wave encoding in accordance with the disclosure. As shown, the transmitter 600 includes a data optimization and forward error correction (FEC) module 610, a sub-periodic time domain modulator 630 configured for sine wave encoding in accordance with the disclosure, and a digital to analog converter 640. The data optimization and FEC module 610 may include, for example, a BCH encoding unit 616 to which the input data is provided and an AES 128 module 614. The BCH block 616 facilitates detection in the receiver by pre-processing the input data to make the number of "1" values within the data substantially equal to the number of "0" values within the data. The AES 128 unit 614 also aids in detection in the receiver by processing the BCH-encoded input data to limit the run length of strings of the same data value.

Consistent with the AES 128 protocol, 16 bits of BCH-encoded data from the BCH encoding unit 616 are provided to the AES 128 module 614 and processed over multiple rounds in accordance with an encryption key. The AES 128 module 614 is not intended to encrypt the data, but can be used for encryption. The resulting cypher output produced by the AES 128 module 614 is then provided to the coder 620.

During operation of the transmitter 600, the input data buffer is transferred to the AES128 module 614 and processed in accordance with a known key (e.g., 0x47). Again, in one embodiment the primary task of the AES 128 module 614 is to achieve a uniform distribution of the bits to prevent a series of 0 bits from following each other. At this point the data produced by the AES 128 module 614 is then transferred to the sine wave modulator 630.

The modulator 630 receives the error-corrected sequence provided by the data optimization and FEC module 610 and identifies an amplitude-encoded sinusoid stored within a symbol lookup table 634 corresponding to each bit of the received error-corrected sequence. In one embodiment the symbol lookup table 634 stores data values (e.g., 3600 data values) corresponding to a single period of each of a set of different sinusoidal symbols. For example, the symbol lookup table 634 could store data values for sinusoidal symbols corresponding to the sinusoidal waveforms in FIG. 4 (e.g., the sinusoids 452 and 454) and/or sinusoidal symbols corresponding to the sinusoidal waveforms in FIG. 5 (e.g., the sinusoids 552 and 554). The data values defining the sinusoidal symbol corresponding to each bit of the received error-corrected sequence are read from the lookup table 634 and provided to the DAC 640 for generation of each period of an encoded analog waveform.

Figure 7:
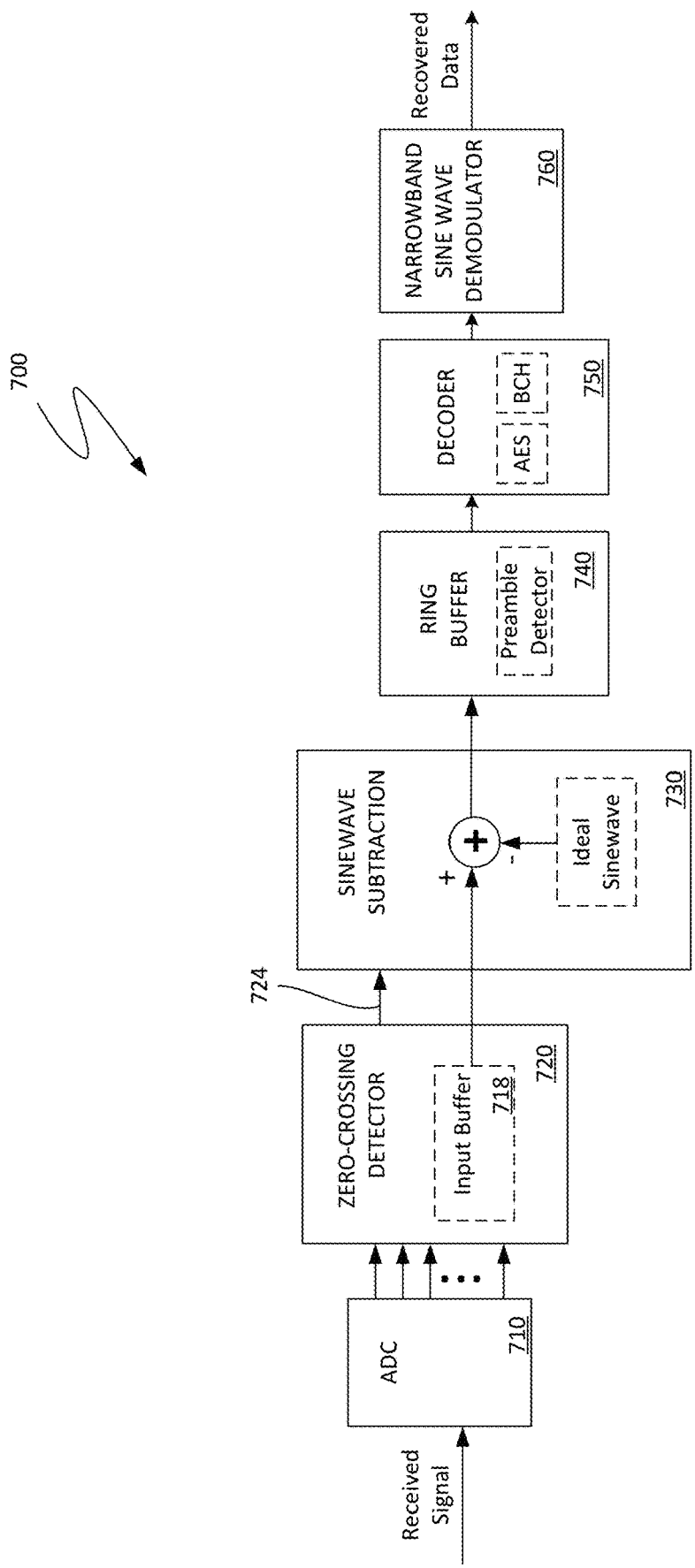
FIG. 7 is a block diagram of a receiver configured to demodulate and decode an encoded waveform generated by the transmitter of FIG. 6.

Attention is now directed to FIG. 7, which is a block diagram of a receiver 700 configured to demodulate and decode an encoded waveform generated by, for example, the transmitter 600. As shown, the receiver 700 includes an analog to digital converter (ADC) 710 operative to create a multi-bit representation the received encoded waveform. The digital samples of the received signal are provided to an input buffer 718 of a zero-crossing detector 720. Upon detecting a zero crossing within the samples stored within the input buffer 718, the zero-crossing detector 720 generates a zero cross detection signal 724. In response to the zero cross detection signal 724, a sine wave subtraction circuit 730 begins a sine wave subtraction process pursuant to which a digital representation of an unmodulated sine wave aligned in phase with the received amplitude-encoded sine wave signal is subtracted from the digital samples of the amplitude-encoded sine wave signal. The sequence of digital values resulting from this subtraction process are then stored within a ring buffer 740 incorporating a preamble detector 742 configured to detect a preamble inserted into the input data stream provided to the transmitter 600. Once the preamble has been detected, the received data stream is provided to a decoder 750 configured to perform the inverse of the operations performed by the AES module 614 and BCH encoding module 616. A sine wave demodulator 760 then identifies the maximum values of the sinusoids present within the data stream produced by the decoder 750, from which replicas of the amplitude-encoded sinusoids encoding the input data may be identified. In the case of full-wave amplitude encoding and as shown in FIG. 4, the absolute values of the positive and negative half cycles of the replicated amplitude-encoded sinusoid within a given period of the received encoded waveform will be substantially the same. In the case of half-wave amplitude encoding and as shown in FIG. 5, the absolute values of the positive and negative half cycles of the replicated amplitude-encoded sinusoid within a given period of the received encoded waveform will be different. Upon identifying the replicas of the amplitude-encoded sinusoids present within the data stream produced by the decoder 750, the demodulator 760 generates a recovered data stream corresponding to an estimate of the input data provided to the transmitter 600.

Figure 8:
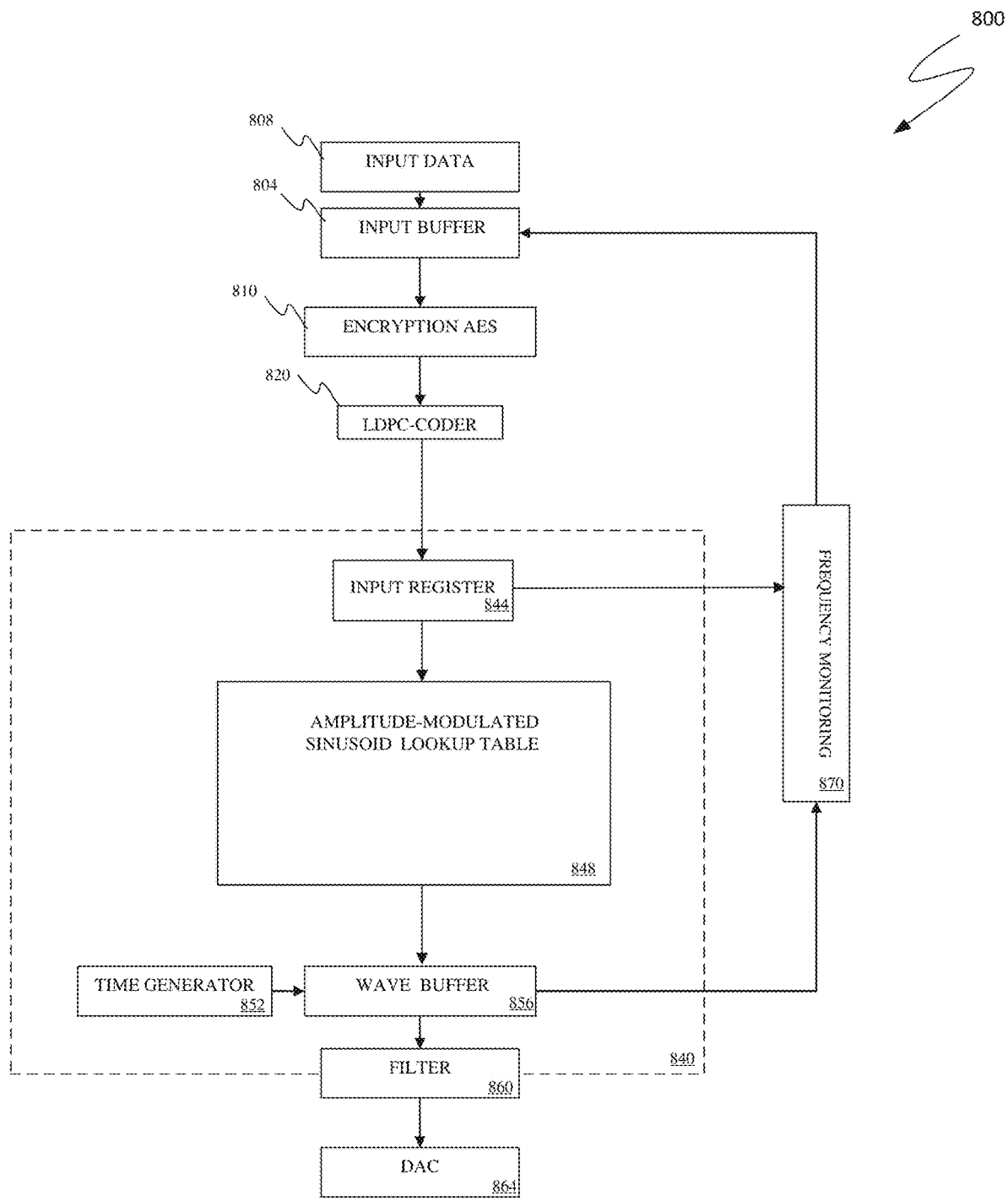
FIG. 8 is a functional block diagram of an embodiment of an amplitude-encoded sine wave transmitter suitable for implementation using a field programmable gate array (FPGA).

Attention is now directed to FIG. 8, which is a functional block diagram of an embodiment of an amplitude-encoded sine wave transmitter 800 suitable for implementation using a field programmable gate array (FPGA). As shown, the transmitter 800 includes an input buffer 804 for storing digital input data 808, a data optimization unit in the form of an AES encryption module 810, and an LDPC coder 820.

A sine wave modulator 840 encodes data values provided by the LDPC coder 820 by identifying, and producing bit streams representing, corresponding amplitude-encoded sinusoids. As shown, the sine wave modulator 840 includes an input register 844, an amplitude-encoded sinusoid lookup table 848, a time generator 852 and a wave buffer 856. The digital representations of the amplitude-encoded sinusoids produced by the modulator 840 are stored in the wave buffer 856 and optionally pre-distorted or otherwise filtered by a filter 860 prior to being converted to analog signals by a digital-to-analog converter 864. The resulting encoded analog signals are transmitted using for example, a transmission line or antenna.

Figure 9:
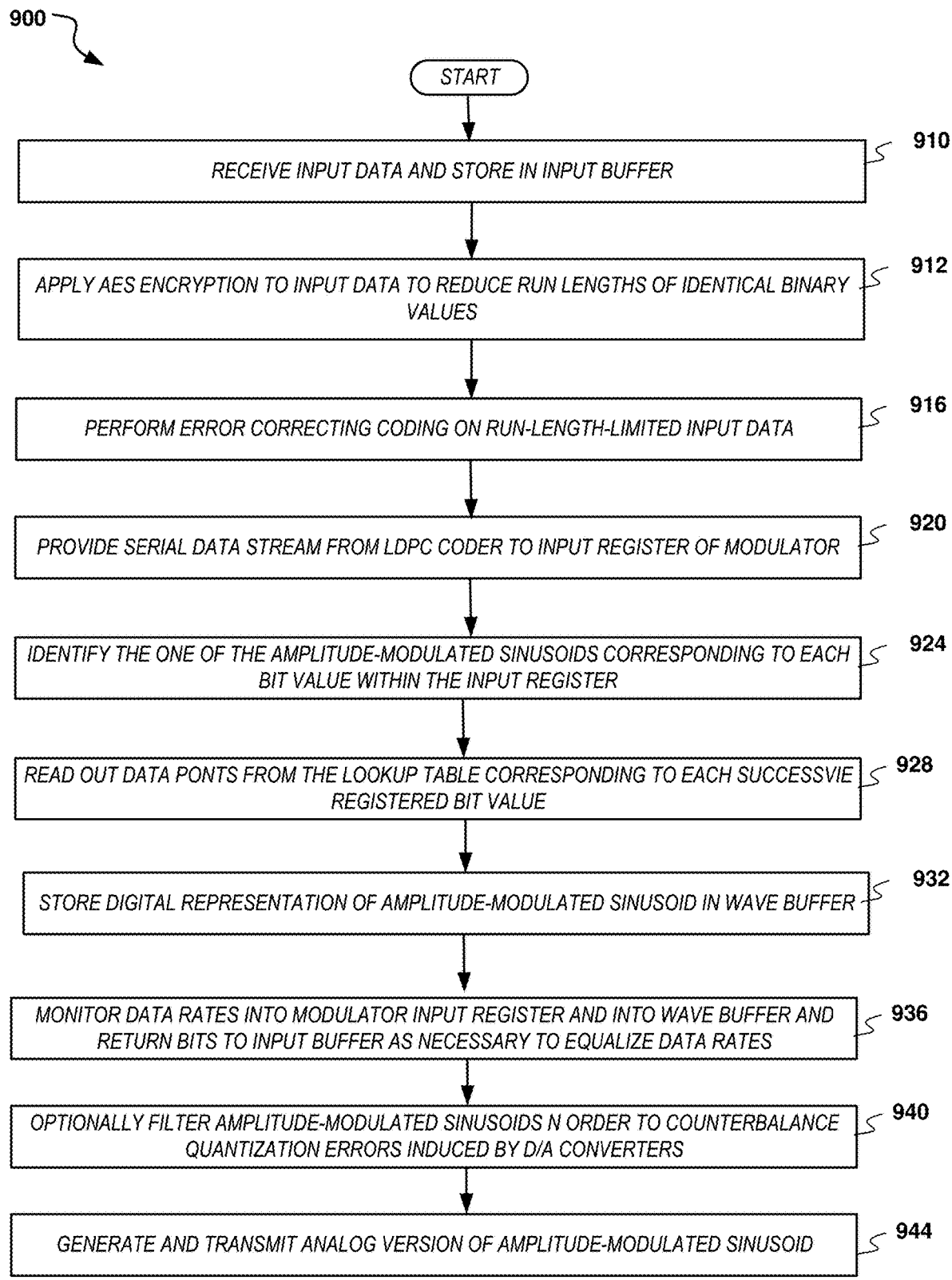
FIG. 9 is a flowchart representative of an exemplary sequence of encoding and other operations performed by the amplitude-encoded sine wave transmitter of FIG. 8 in accordance with an embodiment.

FIG. 9 is a flowchart 900 representative of an exemplary sequence of encoding and other operations performed by the amplitude-encoded sine wave transmitter 800 in accordance with an embodiment. Once input data has been stored within the input buffer 804 (stage 910), it is provided to the AES encryption module 810. In one embodiment the AES encryption module 810 aids in detection of the data at a receiver by processing the input data to limit the run length of strings of the same logical value (stage 912). The resulting output produced by the AES encryption module 810 is provided to the LDPC coder 820, which performs low-density parity-check (LDPC) error correcting coding operations (stage 916). The serial data stream produced by the LDPC coder 820 is then provided to an input register 844 of the modulator 840 (stage 920).

During operation of the sine wave transmitter 800, the bit value from the input register 844 is provided to amplitude-encoded sinusoid lookup table 848 so as to identify the amplitude-encoded sinusoid corresponding to the bit value within the register 844 (stage 924). In one embodiment the lookup table 848 stores data values (e.g., 3600 data values) corresponding to a single period of each of two amplitude-encoded sinusoids (one representing a bit value of "1" and the other representing a bit value of "0"). The data values defining each successive amplitude-encoded sinusoid corresponding to each successive registered bit value are then read from the lookup table 848 (stage 928) and stored within the wave buffer 856 (stage 932).

The time generator 852 provides a clocking signal to the wave buffer 856 so that a relatively constant data rate is maintained into the filter 860. Since the data rate of the input data provided to the input buffer 804 may be somewhat bursty or otherwise irregular, the time generator 852 functions to essentially remove the resulting jitter from the data stream produced by the lookup table 848 before it is provided to the filter 860.

In one embodiment the transmitter 800 includes a frequency monitoring/flow control module 870 operative to control the data rate into the modulator 840. Specifically, the flow control module 870 monitors the data rate into the input register 844 and into the wave buffer 856. When the data rate into the input register 844 begins to exceed the data rate into the wave buffer 856, the flow control module 870 sends data from the input register back to the input buffer 804 until these data rates are equalized (stage 936).

The digital representations of the amplitude-encoded sinusoids stored within the wave buffer 856 are optionally pre-distorted or otherwise filtered by the filter 860 in order to compensate for quantization errors introduced by the digital-to-analog converter 864 (stage 940). In one embodiment this filtering may comprise introducing a pre-distortion having a power spectra in the frequency domain equivalent to the power spectra expected to be induced by such quantization errors, phase-shifted by 180 degrees. The filtered digital signal produced by the filter 860 is then converted to an encoded analog signal by the DAC 864 and transmitted via either a wired or wireless communication medium (stage 944).

Figure 10:
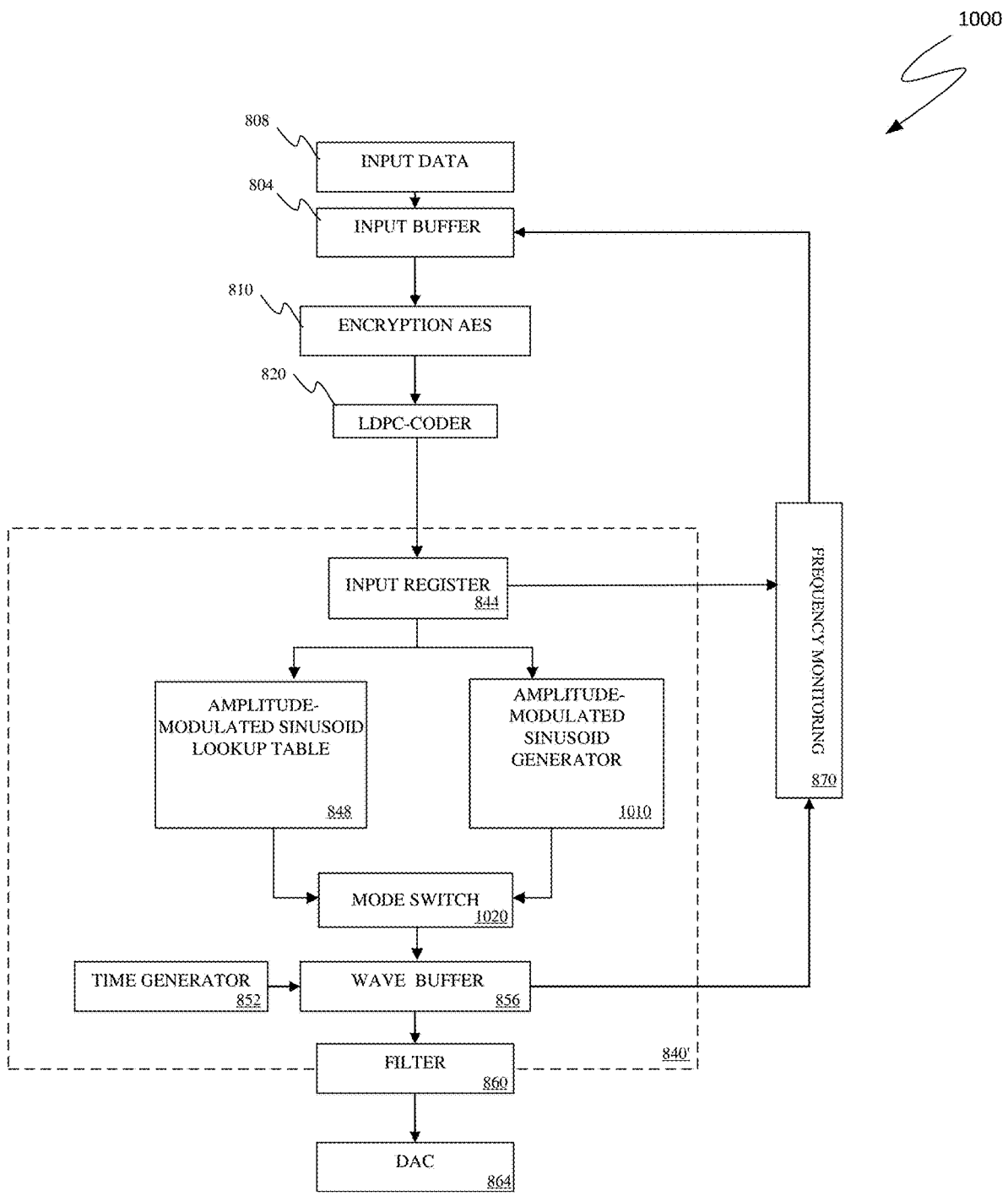
FIG. 10 is a functional block diagram of an another embodiment of an amplitude-encoded sine wave transmitter 1000 suitable for implementation in an FPGA.

Attention is now directed to FIG. 10, which is a functional block diagram of an another embodiment of an amplitude-encoded sine wave transmitter 1000 suitable for implementation in, for example, an FPGA. Except as described below, the structure and function of the transmitter 1000 is substantially identical to the structure and function of the transmitter 800 of FIG. 8. Accordingly, like reference numerals are used in FIGS. 8 and 10 to identify substantially identical transmitter components. As may be appreciated with respect to FIGS. 8 and 10, the structure of the transmitter 1000 differs from that of the transmitter 800 in that the sine wave modulator 840' additionally includes a sine wave generator 1010 and a mode switch 1020. These additional elements are intended to enable the transmitter 1000 to operate at relatively higher data rates and are discussed below.

Figure 11:
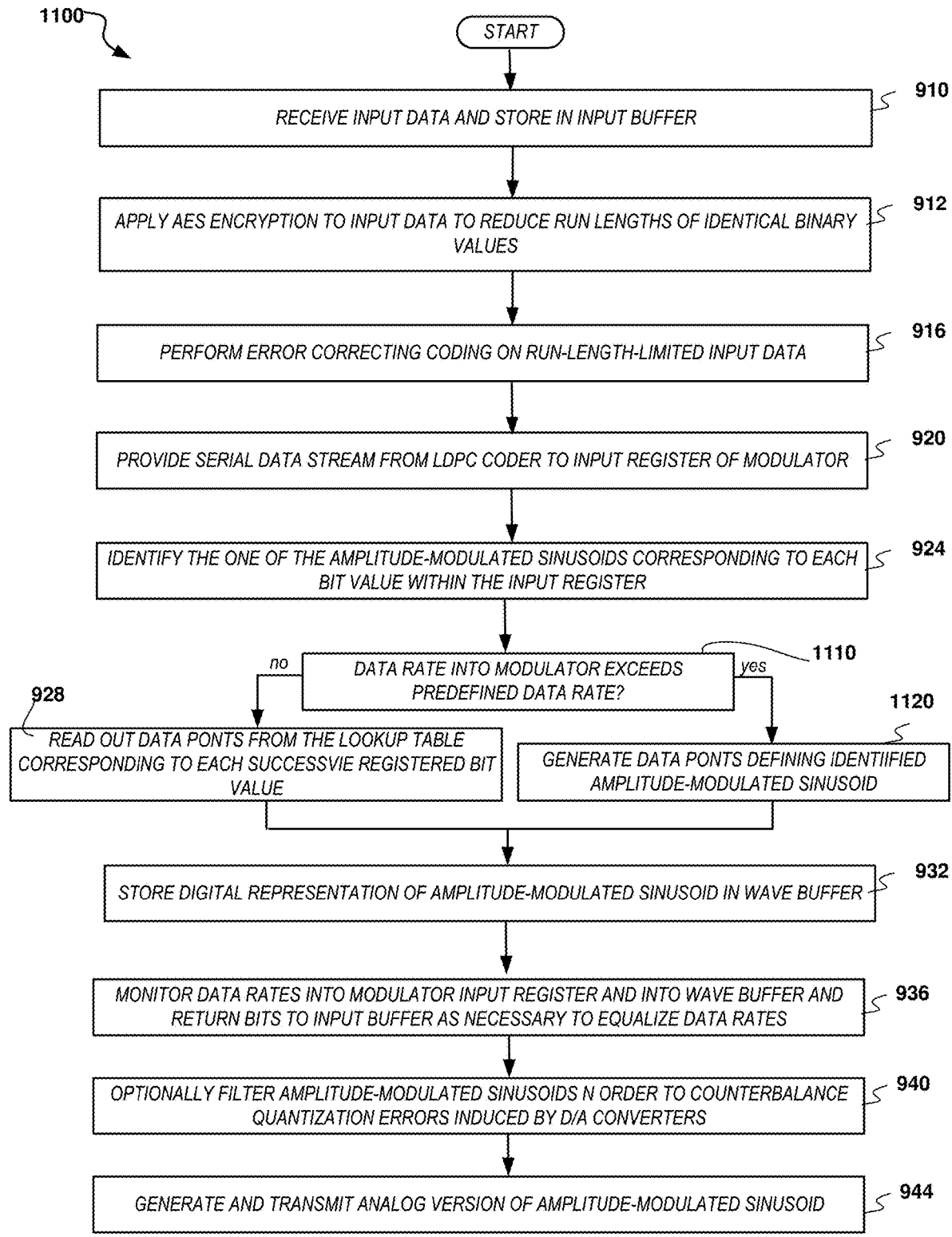
FIG. 11 is a flowchart representative of an exemplary sequence of encoding and other operations performed by the transmitter of FIG. 10 in accordance with an embodiment.

Referring now to FIG. 11, a flowchart 1100 is provided which is representative of an exemplary sequence of encoding and other operations performed by the transmitter 1000 in accordance with an embodiment. Given the similarity in the structure and function of the transmitter 1000 and the transmitter 800 of FIG. 8, like reference numerals are used in the flowcharts of FIGS. 9 and 11 to identify substantially identical operations.

During operation of the transmitter 1000, the sine wave modulator 840' determines whether the data rate provided to the input register 844 exceeds a predefined data rate (stage 1110). At relatively lower data rates, i.e., at data rates less than the predefined data rate known to the modulator 840', the data points defining the amplitude-encoded sinusoid corresponding to the bit value registered in the input register 844 are read out from the amplitude-encoded sinusoid lookup table 848 and provided to the wave buffer 856 via the mode switch 1020 (stage 928). In one embodiment the predefined data rate is set to the data rate at which the stored data defining the amplitude-encoded sinusoids may be read out from the lookup table 848. Because in one embodiment a relatively large number of points (e.g., 3600) are used to define each amplitude-encoded sinusoid, at higher data rates the I/O capabilities of certain memory implementations may be insufficient to support desired input data rates. Accordingly, in one embodiment the data points defining the amplitude-encoded sinusoids corresponding to the bit values sequentially registered in the input register 844 are generated "on the fly" by the amplitude-encoded sinusoid generator 1010 rather than being read out from the sine table 848.

In this embodiment the amplitude-encoded sinusoid generator 1010 may be configured to generate a set of data points (e.g., 360 data points) for, in the case of full-wave amplitude encoding, sinusoids of the desired amplitude by simply executing a processing loop which solves the equation for a sine wave at a set of phase angles (e.g., at each of 360 degrees). In the case of half-wave sinusoidal amplitude encoding, half-sinusoids of the desired amplitudes are generated by executing a processing loop which solves the equation for a sine wave at a set of phase angles (e.g., at each of 180 degrees) spanned by the half sinusoid. Although this approach offers less resolution in defining the amplitude-encoded sinusoids wave relative to the higher-resolution approach in which a large number of data points (e.g. 3600) are pre-stored within the sine table 848 for each amplitude-encoded sinusoid, it enables higher input data rates to be accommodated. The data flow control, filtering and digital-to-analog conversion processes are then performed in the manner described above with reference to FIGS. 8 and 9 once the data points defining each amplitude-encoded sinusoid have been placed in the wave buffer 856.

It is a feature of the sine wave encoding techniques described herein that a series of amplitude-encoded sinusoids may be generated and transmitted as descried herein without creating sidebands of material power. This permits amplitude-encoded sinusoids generated in accordance with the disclosure to be spaced very closely without materially interfering with each other.

Figure 12:
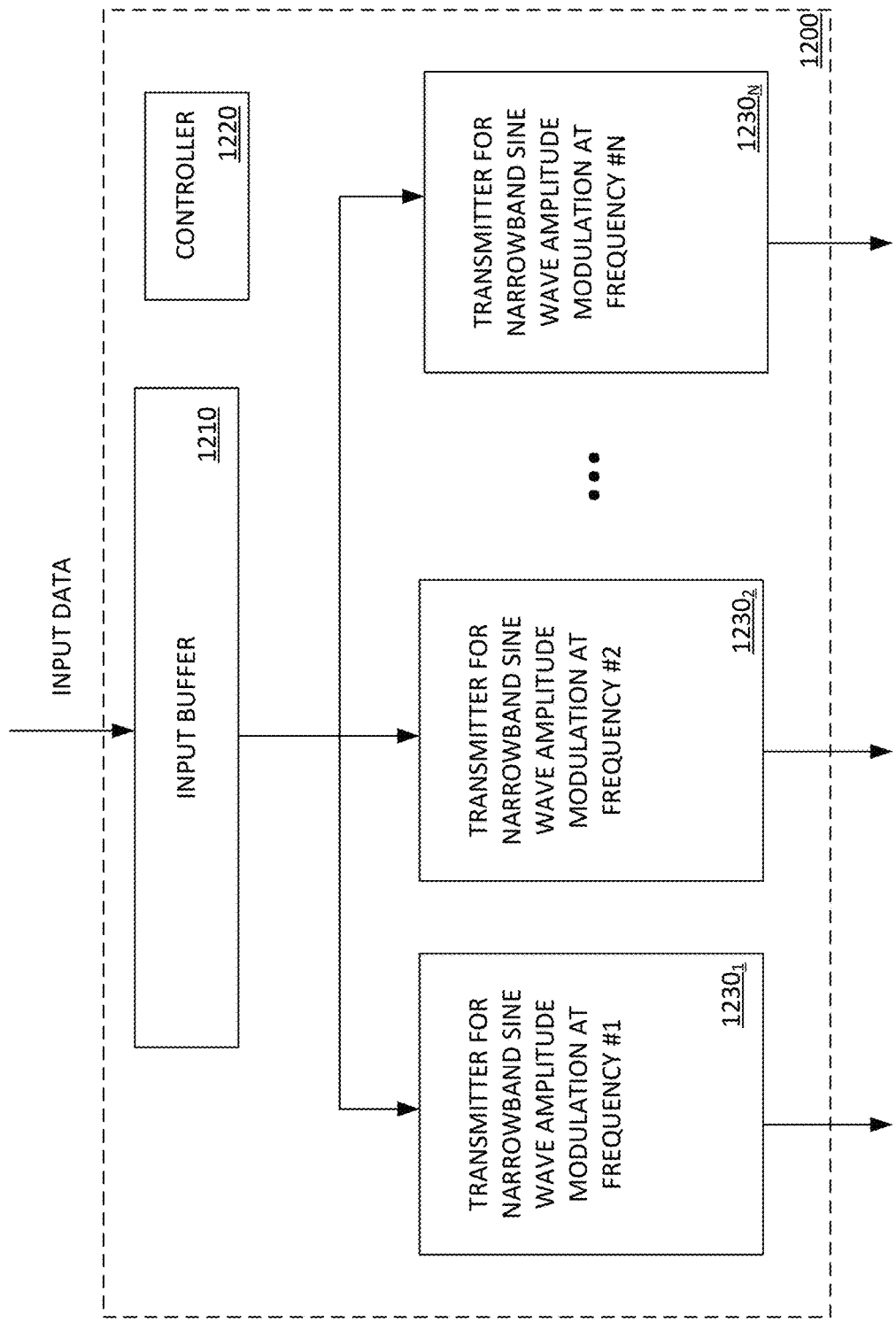
FIG. 12 is a functional block diagram of an another embodiment of an amplitude-encoded sine wave transmitter suitable for implementation in an FPGA.

Attention is now directed to FIG. 12, which is a block diagram representation of a multi-carrier transmitter 1200 for transmitting amplitude-encoded sinusoids at multiple frequencies. As shown, the transmitter 1200 includes an input buffer 1210 in which input data from an external source is stored. The stored data within the input buffer 1210 is allocated among a plurality (N) of amplitude-encoded full wave and/or half wave sinusoids of different frequencies by a controller 1220. Specifically, controller 1220 directs streams of input data to a set of N transmitters 1230. Each of the N transmitters 1230 produces a sequence of amplitude-encoded sinusoids of a particular frequency in accordance with its stream of input data from the input buffer 1210. In one embodiment each of the N transmitters 1230 may be substantially identical to, for example, the transmitter 800 or the transmitter 1000 and may be implemented as a separate cell of an FPGA.

In one embodiment the controller 1220 routes data from the input buffer 2410 to a first of the transmitters $1230_1$ until the input data rate exceeds the maximum data rate of the first transmitter $1230_1$. At this point the controller may provide data to both the first transmitter 1230, and one or more other of the remaining N-1 transmitters 1230. Other data allocation strategies are possible. For example, a fixed amount of data from the input buffer 2410 may be provided to each of the N transmitters 1230 such that each transmitter 1230 operates a data rate of RN, where R is the data rate into the input buffer 2410. For example, a first four data bits received by the input buffer could be routed to transmitter $1230_1$, a second four bits received by the input buffer could be routed to transmitter $1230_2$, and so on. If at some point the data rate into the input buffer 1210 exceeded the aggregate data rate of the N transmitters 1230, one or more of the N transmitters 1230 could send back at least some of the 4-bit data frames provided to it for buffering in the input buffer 1210.

Figure 13:
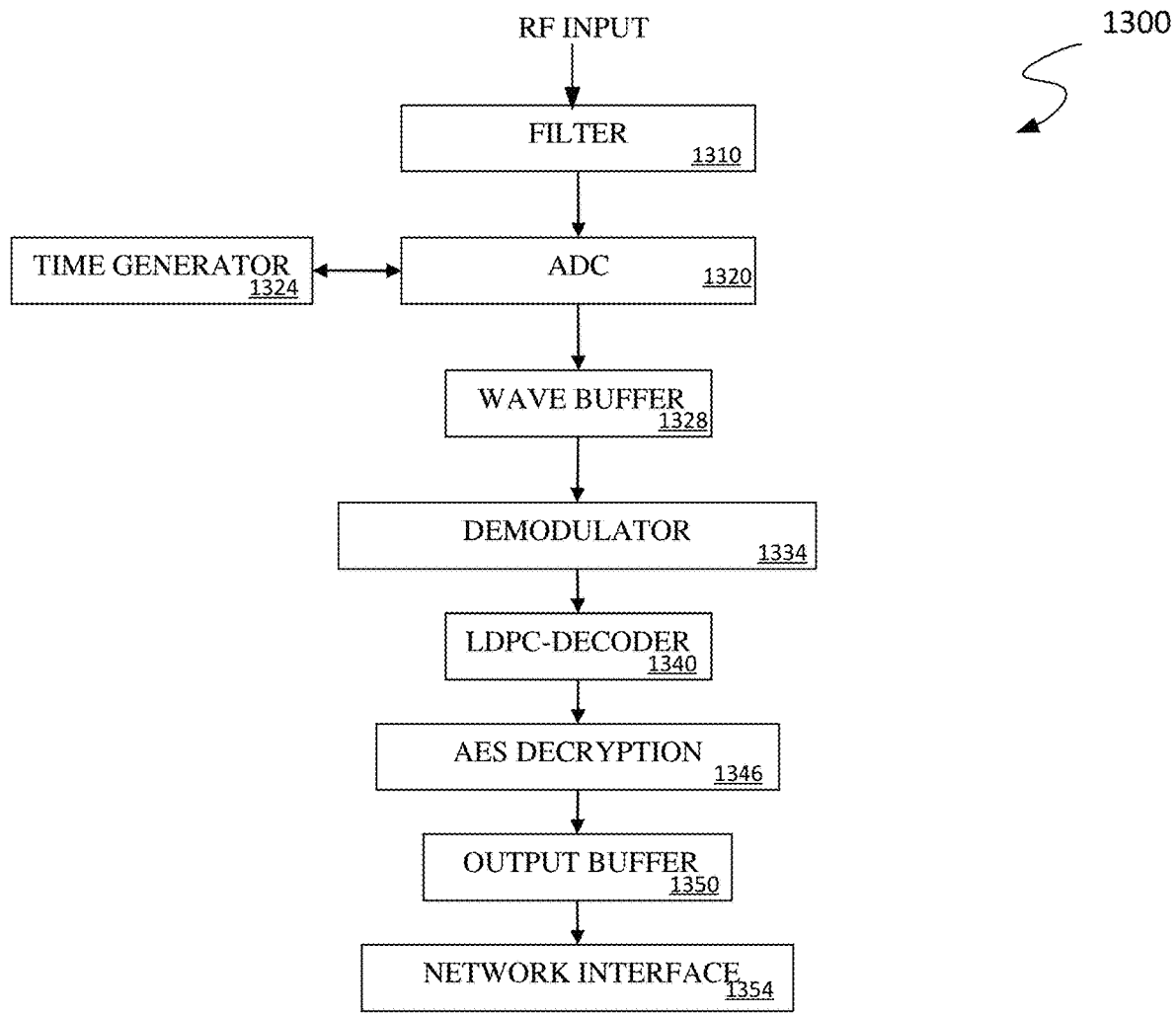
FIG. 13 is a functional block diagram of a receiver configured to receive and demodulate encoded amplitude-encoded sinusoids transmitted by an amplitude-encoded sine wave transmitter configured in accordance with the disclosure. The receiver 22 may output the recovered input data 14' to some other device, such as, by way of example only, a monitor, a computer, an audio component, or a speaker.

Attention is now directed to FIG. 13, which is a functional block diagram of a receiver 1300 configured to receive and demodulate encoded amplitude-encoded sinusoids transmitted by a transmitter configured in accordance with the disclosure. For example, the receiver 1300 is capable of receiving and demodulating encoded waveforms transmitted by the transmitter 800 or the transmitter 1000. As shown, one or more encoded sinusoidal waveforms are received by a filter 1310 of the receiver 1300 and provided to an analog-to-digital converter (ADC) 1320.

A time generator 1324 clocks or otherwise controls the output data rate of the ADC 1320. Amplitude values of each received amplitude-encoded sinusoidal waveform generated by the ADC 1320 are provided to a wave buffer 1328. In one embodiment digital samples representing a replica of the symbol waveform (i.e., the amplitude-encoded sinusoid) within each period of the received encoded sinusoidal waveforms are generated by the ADC 1320. Alternatively, once the receiver 1300 has achieved time synchronization with a received amplitude-encoded sinusoidal waveform (e.g., by detecting zero crossings of the received encoded sine wave), the ADC 1320 may be gated "on" so as to only generated sample values around peak values of the received encoded sine wave. For example, the ADC 1320 may be turned on only for a time period equivalent to approximately one or two degrees of phase at phase angles of 90 and 270°. Thus, in one embodiment sensitivity is enhanced by configuring the ADC 1320 to sample over only a very narrow bandwidth and furthermore by only sampling during approximately 2° to 4° of every 360° sine wave period. When encoded amplitude-encoded sinusoidal waveforms at multiple carrier frequencies are being received, the ADC 1320 may be gated on and off so as to only sample during the 90° and 270° phase angles of each encoded sinusoidal waveform. Alternatively, a separate ADC could be used to sample each encoded amplitude-encoded sinusoidal waveform at narrow windows around the 90° and 270° phase angles of the encoded sinusoidal waveform. The signal samples produced by the ADC 1320 are provided to a wave buffer 1328.

The contents of the wave buffer 1328 are serially provided to a demodulator 1334, which produces a series of logical values representing the bit values encoded by the amplitude-encoded sinusoids occupying the periods of the encoded sinusoidal waveform received by the receiver 1300. In a half-wave amplitude-encoded sinusoid implementation, the demodulator 1334 identifies samples of the digital symbol samples within the wave buffer 1328 corresponding to first and second maximum values of a first half sinusoid (e.g., a positive half sinusoid) and a second half sinusoid (e.g., a negative half sinusoid), respectively, of each of the replicas of the plurality of symbol waveforms defined by the symbol samples within the wave buffer 1328. Again, the symbol samples within the wave buffer 1328 may define replicas of the transmitted symbol waveforms (i.e., the transmitted amplitude-encoded sinusoids) over essentially all phase angles (i.e., from 0° to 360°) or only around narrow phase angle windows surrounding the peak values of the symbol waveforms at 90° and 270°. The demodulator 1334 then estimates values of the bits carried by the transmitted symbol waveforms based upon the first and second maximum values of the first half sinusoid and the second half sinusoid of each of the replicas of the plurality of symbol waveforms. For example, in a full wave amplitude-encoded sinusoid implementation, if the first and second maximum values of the first and second half sinusoids of a symbol replica are determined to be of a predefined high value (e.g., 1.0), the symbol may be deemed to be a logical "1". Conversely, if the first and second maximum values of the first and second half sinusoids of a symbol replica are determined to be of a predefined low value (e.g., 0.8), the symbol may be deemed to be a logical "0". A similar process may be carried out in half-wave implementation by determining the different amplitudes of the first and second half sinusoids of a symbol replica and relating the determined amplitude combination to the associated symbol value (e.g., a symbol replica having a first half sinusoid with a "high" amplitude and a second half sinusoid with a "low" amplitude corresponds to a logical "1").

Again referring to FIG. 13, in the full-wave amplitude-encoded sinusoid implementation, the demodulator 1334 identifies samples of the digital symbol samples within the wave buffer 1328 corresponding to the maximum value of each of the replicas of the plurality of symbol waveforms defined by the symbol samples within the wave buffer 1328. For example, in the case of FIG. 4 the demodulator would determine the maximum value of a replica of amplitude-encoded sinusoid 452 to be substantially equal to 1.0 and would determine the maximum value of a replica of amplitude-encoded sinusoid 454 to be somewhat less than 1.0 (e.g., 0.9 or 0.8). The demodulator 1334 then estimates values of the bits carried by the transmitted symbol waveforms based upon the maximum values of each of the replicas of the plurality of symbol waveforms represented in the wave buffer 1328.

The bit estimates generated by the demodulator 1334 are provided to an LDPC decoder 1340 configured to remove the LDPC encoding applied by the transmitter (e.g., the transmitter 800 or transmitter 1000) from which the encoded sinusoidal waveform was transmitted. Similarly, an AES decryption unit 1346 reverses the encryption applied by a corresponding AES encryption unit in the transmitter. The output of the AES decryption unit 1346 may then be provided to an output buffer 1350. In one embodiment the receiver 1300 searches bit sequences within the output buffer 1350 for a preamble data bit string (e.g., a 0x47 string) signifying the start of a packet. In an exemplary implementation the encoded sinusoidal waveforms received by the receiver 1300 carry frames of 1500 bits. Each frame begins with a predefined bit string (e.g., 0x47) and is followed by the data being communicated. Once the preamble has been identified within the output buffer 1350, an estimate of the data being communicated may be provided to a local area network (LAN) or the like via a network interface 1354. Alternatively, the entire contents of the output buffer 1350 may be provided to an external system configured to identify the preamble for each frame and recover the data conveyed by the frame.

The disclosure discussed herein provides and describes examples of some embodiments of the system for data communication with high spectral efficiency. The designs, figures, and descriptions are non-limiting examples of selected embodiments of the disclosure. For example, other embodiments of the disclosed device may or may not include the features described herein. Moreover, disclosed advantages and benefits may apply to only certain embodiments of the disclosure and should not be used to limit the various disclosures.

As used herein, coupled means directly or indirectly connected by a suitable means known to persons of ordinary skill in the art. Coupled items may include interposed features such as, for example, A is coupled to C via B. Unless otherwise stated, the type of coupling, whether it be mechanical, electrical, fluid, optical, radiation, or other is indicated by the context in which the term is used.

As used in this specification, a module can be, for example, any assembly and/or set of operatively-coupled electrical components associated with performing a specific function(s), and can include, for example, a memory, a processor, electrical traces, optical connectors, software (that is stored in memory and/or executing in hardware) and/or the like.

As used in this specification, the singular forms "a," "an" and "the" include plural referents unless the context clearly dictates otherwise. Thus, for example, the term "an actuator" is intended to mean a single actuator or a combination of actuators.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but can be implemented using a variety of alternative architectures and configurations. Additionally, although the invention is described above in terms of various embodiments and implementations, it should be understood that the various features and functionality described in one or more of the individual embodiments are not limited in their applicability to the particular embodiment with which they are described, but instead can be applied, alone or in some combination, to one or more of the other embodiments of the invention, whether or not such embodiments are described and whether or not such features are presented as being a part of a described embodiment. Thus the breadth and scope of the present invention should not be limited by any of the above-described embodiments.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media in which the KCM may reside include, without limitation, one time programmable (OTP) memory, protected Random-Access Memory (RAM) and flash memory.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Although various modules in the different devices are shown to be located in the processors of the device, they can also be located/stored in the memory of the device (e.g., software modules) and can be accessed and executed by the processors. Accordingly, the specification is intended to embrace all such modifications and variations of the disclosed embodiments that fall within the spirit and scope of the appended claims.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or"

should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method for data communication using amplitude-encoded sinusoids, the method comprising:
   receiving input digital data;
   encoding the input digital data using a plurality of symbol waveforms wherein each of the plurality of symbol waveforms occupies a period of a composite encoded waveform and represents at least one bit of the input digital data, each symbol waveform of the plurality of symbol waveforms having a first half sinusoid of a first polarity and a second half sinusoid of a second polarity opposite to the first polarity;
   wherein a first symbol waveform of the plurality of symbol waveforms is defined so that the first half sinusoid is of a first amplitude and the second half sinusoid is of a second amplitude and wherein a second symbol waveform of the plurality of symbol waveforms is defined so the first half sinusoid is of the second amplitude and the second half sinusoid is of the first amplitude wherein the first amplitude is different from the second amplitude;
   generating an encoded analog waveform from a representation of the composite encoded waveform.

2. The method of claim 1, further including:
   storing first and second representations of the first symbol waveform and the second symbol waveform, respectively, within a memory;
   reading out the first and second representations from the memory upon the receiving of the input digital data.

3. The method of claim 1 wherein the first half sinusoid of the first symbol waveform is a positive half sinusoid and the second half sinusoid of the first symbol waveform is a negative half sinusoid.

4. The method of claim 1 wherein a first period of the first symbol waveform is equal to a second period of the second symbol waveform.

5. A method of recovering input digital data encoded by symbol waveforms wherein each of the symbol waveforms occupies a period of an encoded composite waveform, represents at least one bit of the input digital data, and includes a first half sinusoid and a second half sinusoid, the method including:
   receiving an encoded analog waveform generated using a plurality of the symbol waveforms;
   generating, from the encoded analog waveform, digital symbol samples representing replicas of the plurality of symbol waveforms;
   identifying samples of the digital symbol samples corresponding to first and second maximum values of the first half sinusoid and the second half sinusoid, respectively, of each of the replicas of the plurality of symbol waveforms; and
   estimating the input digital data based upon the first and second maximum values of the first half sinusoid and the second half sinusoid of each of the replicas of the plurality of symbol waveforms.

6. A data communication system, the system comprising:
   an input buffer configured to store input digital data;
   a time domain modulator for encoding the input digital data using a plurality of symbol waveforms wherein each of the plurality of symbol waveforms occupies a period of a composite encoded waveform and represents at least one bit of the input digital data, each symbol waveform of the plurality of symbol waveforms having a first half sinusoid of a first polarity and a second half sinusoid of a second polarity opposite to the first polarity;
   wherein the time domain modulator defines a first symbol waveform of the plurality of symbol waveforms so that the first half sinusoid of the first symbol waveform is of a first amplitude and the second half sinusoid of the first symbol waveform is of a second amplitude and wherein the time domain modulator defines a second symbol waveform of the plurality of symbol waveforms so that the first half sinusoid of the second symbol waveform is of the second amplitude and the second half sinusoid of the second symbol waveform is of the first amplitude wherein the first amplitude is different from the second amplitude;

one or more digital-to-analog converters for generating an encoded analog waveform from a representation of the composite encoded waveform.

7. The system of claim 6, further including;

a memory for storing first and second digital representations of the first symbol waveform and the second symbol waveform, respectively;

wherein the time domain modulator is configured to read out the first and second digital representations from the memory upon receiving bits corresponding to the input digital data stored within the input buffer.

8. The system of claim 6 wherein the first half sinusoid of the first symbol waveform is a positive half sinusoid and the second half sinusoid of the first symbol waveform is a negative half sinusoid.

9. The system of claim 6 wherein a first period of the first symbol waveform is equal to a second period of the second symbol waveform.

10. The method of claim 1 wherein the second amplitude is within 10% of the first amplitude.

11. A method for data communication using amplitude-encoded sinusoids, the method comprising:

receiving input digital data;

encoding the input digital data using a plurality of symbol waveforms wherein each of the plurality of symbol waveforms occupies a period of a composite encoded waveform and represents at least one bit of the input digital data wherein a first symbol waveform of the plurality of symbol waveforms is defined by a sinusoid of a first amplitude and wherein a second symbol waveform of the plurality of symbol waveforms is defined by a sinusoid of a second amplitude wherein the first amplitude is different from the second amplitude;

storing first and second representations of the first symbol waveform and the second symbol waveform, respectively, within a memory;

reading out the first and second representations from the memory upon the receiving of the input digital data; and generating an encoded analog waveform from a representation of the composite encoded waveform.

12. A method of recovering input digital data encoded by symbol waveforms wherein each of the symbol waveforms represents at least one bit of the input digital data and includes a one-period sinusoid occupying a period of an encoded composite waveform, each one period sinusoid being of a first amplitude corresponding to a first bit value or of a second amplitude corresponding to a second bit value, the method including:

receiving an encoded analog waveform generated using a plurality of the symbol waveforms;

generating, using the encoded analog waveform, digital symbol samples representing the plurality of symbol waveforms;

identifying, based upon the digital symbol samples, recovered sinusoidal amplitudes corresponding to replicas of the plurality of symbol waveforms; and estimating the input digital data based upon the recovered sinusoidal amplitudes.

* * * * *